United States Patent
Lee et al.

(10) Patent No.: US 10,826,722 B2
(45) Date of Patent: Nov. 3, 2020

(54) CONTROLLER BASED SERVICE POLICY MAPPING TO ESTABLISH DIFFERENT TUNNELS FOR DIFFERENT APPLICATIONS

(71) Applicant: Futurewei Technologies, Inc., Plano, TX (US)

(72) Inventors: Young Lee, Plano, TX (US); Italo Busi, Cerro Maggiore (IT)

(73) Assignee: Futurewei Technologies, Inc., Plano, TX (US)

( * ) Notice: Subject to any disclaimer, the term of this patent is extended or adjusted under 35 U.S.C. 154(b) by 196 days.

(21) Appl. No.: 15/845,651

(22) Filed: Dec. 18, 2017

(65) Prior Publication Data
US 2019/0190746 A1  Jun. 20, 2019

(51) Int. Cl.
*H04L 12/46* (2006.01)
*H04L 12/813* (2013.01)
*H04L 12/24* (2006.01)

(52) U.S. Cl.
CPC ...... *H04L 12/4633* (2013.01); *H04L 12/4641* (2013.01); *H04L 41/20* (2013.01); *H04L 47/20* (2013.01)

(58) Field of Classification Search
CPC ............. H04L 12/465; H04L 63/0236; H04L 12/2852; H04L 12/4641; H04L 63/0272; H04L 12/4645; H04L 41/20; H04L 12/467; H04L 45/50; H04L 45/66; H04L 47/20; H04W 8/26
See application file for complete search history.

(56) References Cited

U.S. PATENT DOCUMENTS

2002/0188732 A1  12/2002  Buckman et al.
2015/0222557 A1*  8/2015  Bhattacharya
(Continued)

FOREIGN PATENT DOCUMENTS

| CN | 102986189 A | 3/2013 |
| CN | 103747502 A | 4/2014 |
| CN | 104980347 A | 10/2015 |

OTHER PUBLICATIONS

Wen, et al., "A YANG Data Model for L2VPN Service Delivery," draft-ietf-l2sm-l2vpn-service-model-03, Sep. 18, 2017, 174 pages.
(Continued)

*Primary Examiner* — Marsha D Banks Harold
*Assistant Examiner* — Dharmesh J Patel
(74) *Attorney, Agent, or Firm* — Conley Rose, P.C.

(57) ABSTRACT

A method implemented by a customer network controller (CNC) in a network comprises storing, by a memory of the CNC, a mapping between a virtual local area network (VLAN) identifier (ID) of a VLAN, an application ID of an application executed in the VLAN, and a service policy associated with the application, the service policy defining a network requirement for the application, the VLAN being associated with a customer edge (CE), transmitting, by a transmitter of the CNC, a tunnel creation request comprising the VLAN ID, the application ID, and the service policy, and storing, by the memory, a tunnel ID of a tunnel established in response to the tunnel creation request, the tunnel defining a path between an ingress provider edge (PE) node and an egress PE node that satisfies the service policy.

18 Claims, 11 Drawing Sheets

(56) References Cited

U.S. PATENT DOCUMENTS

2016/0080502 A1* 3/2016 Yadav et al.
2016/0182383 A1 6/2016 Pedersen

OTHER PUBLICATIONS

Lee, Ed., et al., "A Yang Data Model for ACTN VN Operation," draft-lee-teas-actn-vn-yang-06, Aug. 2, 2017, 30 pages.
Lee, Ed., et al., "A Yang Data Model for ACTN VN Operation," draft-lee-teas-actn-vn-yang-07, Oct. 23, 2017, 30 pages.
Enns, Ed, et al ., "Network Configuration Protocol (NETCONF)," RFC 6241, Jun. 2011, 113 pages.
Machine Translation and Abstract of Chinese Publication No. CN103747502, Apr. 23, 2014, 42 pages.
Machine Translation and Abstract of Chinese Publication No. CN104980347, Oct. 14, 2015, 22 pages.
Foreign Communication From a Counterpart Application, PCT Application No. PCT/CN2018/121441, English Translation of International Search Report dated Feb. 27, 2019, 5 pages.
Foreign Communication From a Counterpart Application, PCT Application No. PCT/CN2018/121441, English Translation of Written Opinion dated Feb. 27, 2019, 4 pages.
Vasseur, JP., Ed., et al. "Path Computation Element (PCE) Communication Protocol (PCEP)" RFC 5440, Mar. 2009, 88 pages.
Bjorklund, M., Ed., "YANG—A Data Modeling Language for the Network Configuration Protocol (NETCONF)" RFC 6020, Oct. 2010, 173 pages.
Bierman, A., et al., "RESTCONF Protocol" RFC 8040, Jan. 2017, 137 pages.

* cited by examiner

500

| VLAN ID 503 | Application ID 506 | Service Policy 509 | | | Tunnel ID 521 |
|---|---|---|---|---|---|
| | | Latency level 512 | L0 Path Sharing Policy 515 | Path Protection Level 518 | |
| 550A — 143A | 151 | <50ms | Sharing Allowed | 1+1 | A |
| 550B — 143A | 152 | N/A | Sharing Allowed | 1:0 | B |
| 550C — 146C | 151 | <50ms | Sharing Allowed | 1+1 | A |
| 550N — 146C | 154 | N/A | Sharing not allowed | 1+1 | C |

```
module: ietf-te-service-policy-mapping
   +--rw te-service-mapping
   |  +--rw service-mapping
   |  |  +--rw mapping-list* [map-id]
   |  |     +--rw map-id           uint32
   |  |     +--rw map-type?        map-type
   |  |     +--rw (service)?
   |  |     |  +--:(l3vpn)
   |  |     |  |  +--rw l3vpn-ref?      -> /l3:l3vpn-svc/vpn-services/vpn-service/vpn-id
   |  |     |  +--:(l2vpn)
   |  |     |     +--rw l2vpn-ref?      -> /l2:l2vpn-svc/vpn-services/vpn-svc/vpn-id
   |  |     +--rw (te)?
   |  |        +--:(actn-vn)
   |  |        |  +--rw actn-vn-ref?    -> /vn:actn/vn/vn-list/vn-id
   |  |        +--:(te)
   |  |           +--rw te-tunnel-list*   te:tunnel-ref
   |  +--rw site-mapping
   |  |  +--rw mapping-list* [map-id]
   |  |     +--rw map-id           uint32
   |  |     +--rw (service)?
   |  |     |  +--:(l3vpn)
   |  |     |  |  +--rw l3vpn-ref?    -> /l3:l3vpn-svc/sites/site/site-id
   |  |     |  +--:(l2vpn)
   |  |     |     +--rw l2vpn-ref?    -> /l2:l2vpn-svc/sites/site/site-id
   |  |     +--rw (te)?
804        +--:(actn-vn)
   |  |        |  +--rw actn-vn-ref?  -> /vn:actn/ap/access-point-list/access-point-id
   |  |        +--:(te)
   |  +--rw application-policy-mapping
   |     +--rw mapping-list* [map-id]
   |        +--rw map-id           uint32
   |        +--rw (service)?
   |        |  +--:(l3vpn)
   |        |  |  +--rw l3vpn-ref?      -> /l3:l3vpn-svc/vpn-services/vpn-service/vpn-id
   |        |  +--:(l2vpn)
   |        |     +--rw l2vpn-ref?      -> /l2:l2vpn-svc/vpn-services/vpn-svc/vpn-id
   |        +--rw policy-type-1?   policy-type-1
   |        +--rw policy-type-2?   policy-type-2
   |        +--rw policy-type-3?   policy-type-3
```

```
+--ro te-service-mapping-state
   +--ro service-mapping
   |  +--ro mapping-list* [map-id]
   |     +--ro map-id              uint32
   |     +--ro map-type?            map-type
   |     +--ro (service)?
   |     |  +--:(l3vpn)
   |     |  |  +--ro l3vpn-ref?        -> /l3:l3vpn-svc/vpn-services/vpn-service/vpn-id
   |     |  +--:(l2vpn)
   |     |     +--ro l2vpn-ref?        -> /l2:l2vpn-svc/vpn-services/vpn-svc/vpn-id
   |     +--ro (te)?
   |        +--:(actn-vn)
   |        |  +--ro actn-vn-ref?      -> /vn:actn/vn/vn-list/vn-id
   |        +--:(te)
   |           +--ro te-tunnel-list*   te:tunnel-ref
   +--ro site-mapping
   |  +--ro mapping-list* [map-id]
   |     +--ro map-id        uint32
   |     +--ro (service)?
   |     |  +--:(l3vpn)
   |     |  |  +--ro l3vpn-ref?     -> /l3:l3vpn-svc/sites/site/site-id
   |     |  +--:(l2vpn)
   |     |     +--ro l2vpn-ref?     -> /l2:l2vpn-svc/sites/site/site-id
   |     +--ro (te)?
   |        +--:(actn-vn)
   |        |  +--ro actn-vn-ref?   -> /vn:actn/ap/access-point-list/access-point-id
   |        +--:(te)
   +--ro application-policy-mapping
      +--ro mapping-list* [map-id]
         +--ro map-id        uint32
         +--ro (service)?
         |  +--:(l3vpn)
         |  |  +--ro l3vpn-ref?        -> /l3:l3vpn-svc/vpn-services/vpn-service/vpn-id
         |  +--:(l2vpn)
         |     +--ro l2vpn-ref?        -> /l2:l2vpn-svc/vpn-services/vpn-svc/vpn-id
         +--ro policy-type-1?   policy-type-1
         +--ro policy-type-2?   policy-type-2
         +--ro policy-type-3?   policy-type-3
```

CONTROLLER BASED SERVICE POLICY MAPPING TO ESTABLISH DIFFERENT TUNNELS FOR DIFFERENT APPLICATIONS

STATEMENT REGARDING FEDERALLY SPONSORED RESEARCH OR DEVELOPMENT

Not applicable.

REFERENCE TO A MICROFICHE APPENDIX

Not applicable.

FIELD OF INVENTION

The present disclosure pertains to the field of telecommunications. In particular, the present disclosure relates generally to networking mechanisms in a SDN and also to improved methods and apparatuses for creating tunnels between endpoints in a SDN.

BACKGROUND

Software defined network (SDN) is a networking paradigm that decouples network control and forwarding functions. The decoupling of the control plane from the data plane allows for centralization of network control, enabling effective policy administration and flexible management. The centralization of network control facilitates various network functionalities, such as network measurements, traffic engineering, enhanced quality of services, and enhanced access control. With the growing availability of SDN-enabled nodes and protocols, many organizations have started deploying SDN networks.

Ethernet Virtual Private Line (EVPL) improves application performance across a network with a private, point-to-multipoint network design between multiple locations, even to a third party data center or cloud platform. EVPL offers high capacity multi-point connectivity by providing an Ethernet Virtual network (EVN) between multiple customer locations, or customer edges (CEs). Each CE may be attached to multiple Virtual Local Area Networks (VLANs). Multiple different applications may be executed at each of the VLANs, where each application may have different network requirements.

SUMMARY

Traditional networks create tunnels between endpoints without considering the application requesting the tunnel. Disclosed herein are embodiments directed to creating a different tunnel for different applications based on a service policy for each of the applications. In an embodiment, the disclosure includes a method implemented by a customer network controller (CNC) in a network. The method comprises storing, by a memory of the CNC, a mapping between a VLAN identifier (ID) of a VLAN, an application ID of an application executed in the VLAN, and a service policy associated with the application, the service policy defining a network requirement for the application, the VLAN being associated with a CE, transmitting, by a transmitter of the CNC, a tunnel creation request comprising the VLAN ID, the application ID, and the service policy, and storing, by the memory, a tunnel ID of a tunnel established in response to the tunnel creation request, the tunnel defining a path between an ingress provider edge (PE) node and an egress PE node that satisfies the service policy. In some embodiments, the method further comprises receiving, by a receiver of the CNC, VLAN information from the CE, wherein the VLAN information comprises a plurality of identifiers identifying a plurality of VLANs associated with the CE, a plurality of identifiers identifying a plurality of applications associated with each of the VLANs, and a plurality of service policies for each of the applications.

In some embodiments, corresponding to the tunnel that satisfies the service policy is stored by the memory. In some embodiments, the method further comprises receiving a message indicating that the tunnel satisfying the service policy has been established in the network. In some embodiments, the message is received from a central controller, wherein the central controller includes at least one of a Multi-Domain Service Coordinator (MDSC), Provisioning Network Controller (PNC), super controller, or domain controller. In some embodiments, the method further comprises storing, by the memory of the CNC, a service policy catalog comprising a plurality of service policies and a plurality of values associated with each of the service policies, and assigning, by a processor of the CNC, one of the values for each of the service policies to the application. In some embodiments, the method further comprises transmitting, by the transmitter of the CNC, a second tunnel creation request comprising the VLAN ID, a second application ID of a second application, and the service policy, and storing, by the memory, the tunnel ID of the tunnel in a second mapping corresponding to the second application.

In an embodiment, the disclosure includes a central controller configured to establish traffic engineered (TE) tunnels in a network, comprising a receiver configured to receive a tunnel creation request from a CNC, the tunnel creation request comprising a VLAN ID of a VLAN, an application ID of an application executed in the VLAN, and a service policy associated with the application, the service policy defining a network requirement for the application, the VLAN being associated with a CE, a processor coupled to the receiver and configured to determine a tunnel that satisfies the service policy based on available resources in the network, and a transmitter coupled to the processor and configured to transmit a message to the CNC, the message indicating whether the tunnel that satisfies the service policy has been established. In some embodiments, the tunnel is established between an ingress PE router coupled to the CE and an egress PE router coupled to a second CE, wherein the second CE is associated with a service provider, and/or the tunnel creation request is transmitted to a MDSC or super controller, and/or the central controller is a SDN controller, and/or the service policy comprises a value defining at least one of a bandwidth, a throughput, a latency, or an error rate associated with the application. In some embodiments, the processor is further configured to generate a tunnel ID that uniquely identifies the tunnel that satisfies the service policy.

In an embodiment, the disclosure includes a CNC implemented in a network, comprising a memory configured to store a mapping between a VLAN ID of a VLAN, an application ID of an application executed in the VLAN, and a service policy associated with the application, the service policy defining a network requirement for the application, the VLAN being associated with a CE, and a transmitter coupled to the memory and configured to transmit a tunnel creation request comprising the VLAN ID, the application ID, and the service policy, the memory further configured to store a tunnel ID of a tunnel established in response to the tunnel creation request, and the tunnel satisfying the service policy. In some embodiments, the CNC further comprises a receiver coupled to the memory and configured to receive VLAN information from the CE, wherein the VLAN information comprises a plurality of identifiers identifying a plurality of VLANs associated with the CE, a plurality of identifiers identifying a plurality of applications associated with each of the VLANs, and a plurality of service policies for each of the applications. In some embodiments, the tunnel creation request is transmitted after determining that the tunnel ID corresponding to the tunnel that satisfies the service policy is stored by the memory. In some embodiments, the CNC further comprises a receiver coupled to the memory and configured to receive a message indicating that the tunnel satisfying the service policy has been established in the network. In some embodiments, the message is received from a provisioning network controller or a multi-domain service coordinator, and/or the memory is further configured to store a service policy catalog comprising a plurality of service policies and a plurality of values associated with each of the service policies, and wherein the CNC further comprises a processor coupled to the memory and configured to assign one of the values for each of the service policies to the application, and/or the transmitter is further configured to transmit a second tunnel creation request comprising the ID of the VLAN, a second ID of a second application, and the service policy, and wherein the memory is further configured to store the tunnel ID of the tunnel in a second mapping corresponding to the second application.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 5 is a table illustrating examples of tunnel assignments for applications having different service policies and corresponding values.

FIG. 8 is a read-write YANG data model defining how service policies are mapped to applications and tunnels at the CNC or the central controller.

FIG. 9 is a read-only YANG data model defining how service policies are mapped to applications and tunnels at the CNC or the central controller.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalent.

Applications associated with the same VLAN may have different network requirements, or service policies that are specific to the application. However, in a network implementing EVPL over an Optical Transport Network (OTN), an EVN between different CEs is typically established only based on an ID of the VLAN without regard to the application that is establishing the EVN or the tunnel. A controller establishes a tunnel between ingress Provider Edge (PE) nodes and egress PE nodes attached to the different CEs based only on the ID of the VLAN regardless of whether the application has a specific service policy. Therefore, EVPL over OTN networks do not have a mechanism by which to create a different tunnel for different applications executed in the same VLAN based on a service policy of each of the applications. Disclosed herein are embodiments directed to creating a different tunnel for different applications executed in the same VLAN based on a service policy for each of the applications.

Figure 1:
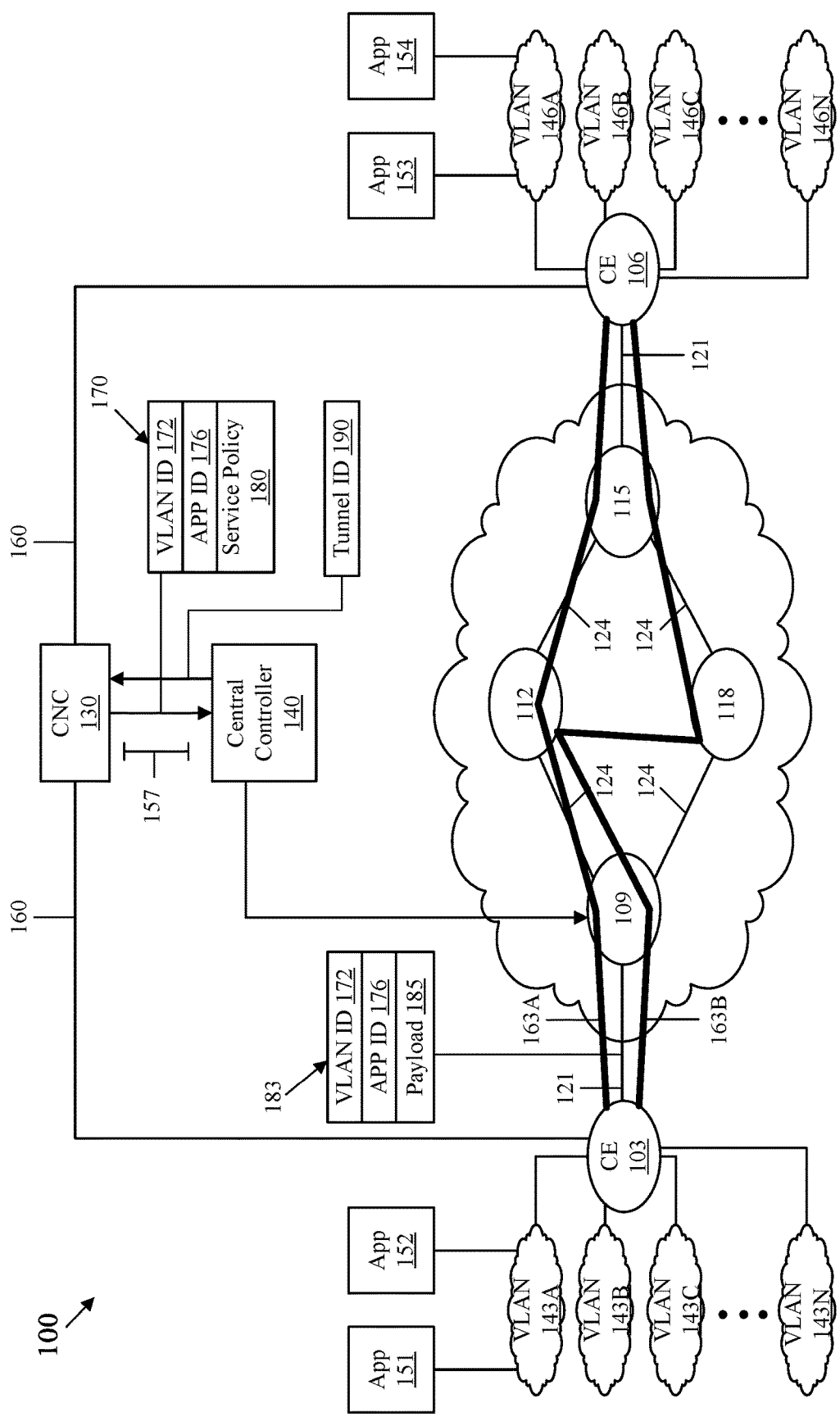
FIG. 1 is a schematic diagram of a network according to an embodiment of the disclosure.

FIG. 1 is a schematic diagram of a network 100 according to an embodiment of the disclosure. In various embodiments, network 100 may implement SDN, EVPL, Abstraction and Control of Traffic Engineered Networks (ACTN), a YANG data model, a Representational State Transfer Configuration (RESTCONF) protocol, a Network Configuration (NETCONF) protocol, and/or a Path Computation Element Communication Protocol (PCEP). ACTN may be implemented as defined by Internet Engineering Task Force (IETF) document entitled "A Yang Data Model for ACTN VN Operation," version 7, dated Oct. 23, 2017, which is hereby incorporated by reference in its entirety. The YANG data model is implemented as defined by IETF Request for Comments (RFC) 6020 document entitled, "YANG—A Data Modeling Language for the Network Configuration Protocol (NETCONF)," published October 2010, which is hereby incorporated by reference in its entirety. The NETCONF protocol is implemented as defined by IETF RFC 6241 document entitled "Network Configuration Protocol (NETCONF)," dated June 2011, which is hereby incorporated by reference in its entirety. The RESTCONF protocol is implemented as defined by IETF RFC 8040 document entitled, "RESTCONF protocol," dated January 2017, which is hereby incorporated by reference in its entirety. PCEP is implemented as defined by IETF RFC 5440 document entitled, "Path Computation Element (PCE) Communication Protocol (PCEP)," dated March 2009, which is hereby incorporated by reference in its entirety. For example, network 100 implements EVPL over OTN. The underlying infrastructure of the network 100 may be any type of network such as an electrical network, an optical network, or combinations thereof. In an embodiment, the network 100 may employ an Internet protocol (IP) transport layer and a Multiprotocol Label Switching (MPLS) data forwarding plane.

The network 100 comprises CEs 103 and 106, nodes 109, 112, 115, and 118, CNC 130, and a central controller 140. The CEs 103 and 106 are network devices located at customer sites external to the network 100. For example, CEs 103 and 106 may be routers, bridges, switches, or hosts. The CEs 103 and 106 may originate and/or terminate customer traffic. As shown in FIG. 1, each CE 103 and 106 is connected to one or more VLANs 143A-N and 146A-N. CE 103 may be connected to VLANs 143A-N, which may each be different VLANS. Similarly, CE 106 may be connected to VLANs 146A-N, which also may each be different VLANS. Each of VLANs 143A-N and 146A-N may be identified by a different unique VLAN ID 172. Each VLAN 143A-N and 146A-N may be associated with one or more applications 151-154 (shown as APP 151-154 in FIG. 1). For example, VLAN 143A may be connected to one or more network devices that implements application 151 and 152. VLAN 146A may be connected to one more network devices that implements applications 153 and 154. Each of the applications 151-154 may be identified by a different unique application ID 176. Each of the applications 151-154 may have a different service policy 180 that defines network requirements that must be satisfied to properly execute the application, as will be further described below with reference to FIGS. 3-5.

In some embodiments, CEs 103 and 106 are dedicated to a particular customer and connected to one or more of nodes 109, 112, 115, and 118 by links 121. Nodes 109, 112, 115, and 118 are also interconnected to each other by links 124. The links 121 and 124 may comprise physical links such as fiber optic links, electrical links, wireless links, and logical links used to transport data in the network 100. The nodes 109, 112, 115, and 118 are any devices or components such as routers and switches configured to perform both MPLS signaling to establish Label-Switched Paths (LSPs) and tunnels in the network 100 and data forwarding along the established LSPs and tunnels.

A node that receives traffic from a CE is referred to as an ingress PE node, and a node that sends traffic to a CE is referred to as an egress PE node. In some embodiments, nodes 109 and 115 are PE nodes and may be referred to as ingress PE node 109 and egress PE node 115. For example, ingress PE node 109 may be a PE node 109 located at the edge of network 100 that directs traffic to and from CE 103. Similarly, egress PE node 115 may be a PE node 115 located at the edge of network 100 that directs traffic to and from CE 106. In some embodiments, PE nodes 109 and 115 may connect to one or more nodes outside of the network 100. In some embodiments, network 100 may comprise area border routers located between borders of multiple domains when network 100 includes multiple domains. Nodes 112 and 118 that are located internally within one or more domains of network 100 are referred to as internal nodes. Each of nodes 112 and 118 forwards traffic within a corresponding domain of network 100. While only four nodes 109, 112, 115, and 118 are shown in network 100, any number of nodes may be included in network 100.

In some embodiments, the PE nodes 109 and 115 are managed by a service provider that can support multiple VPNs for different customers. A service provider is an organization responsible for operating the network 100 that offers Virtual Private Network (VPN) services to clients and customers. The PE nodes 109 and 115 may be located at a service provider point of presence and may be managed by the service provider.

The CNC 130 is a controller device configured to communicate with CEs 103 and 106 and obtain VLAN information including information about the VLANs 143A-N and 146A-N associated with each of the CEs 103 and 106 in network 100, among other types of information. For example, the VLAN information may be formatted and include information according to the Layer 2 Service Model (L2SM) as described in IETF document entitled, "A Yang Data Model for L2VPN Service Delivery," version 3, dated Sep. 18, 2017 (referred to herein as the L2SM document), which is hereby incorporated by reference in its entirety. In one embodiment, the VLAN information may include the VLAN IDs 172 of each of the VLANs 143A-N and 146A-N. In some embodiments, the VLAN information may also include the information regarding the applications that are executed at each VLAN, such as the application ID 176 and the service policies 180 for each of the applications 151-154. In some embodiments, the CNC 130 may be configured to send this VLAN information to the central controller 140.

In an embodiment, the central controller 140 may refer to both a Multi-Domain Service Coordinator (MDSC) and a Provisioning Network Controller (PNC) collectively. In an embodiment, the central controller 140 may refer to both a super controller and a domain controller collectively. For example, when network 100 is a multi-domain network, then an MDSC or a super controller may be connected in between the CNC 130 and multiple PNCs or domain controllers that are associated with each of the domains. The MDSC or super controller and the PNCs or domain controllers can be collocated or the MDSC or super controller and the PNCs or domain controllers may be located separately. The MDSC or super controller is configured to coordinate functions performed by network 100 for the applications 151-154 executed at each of CEs 103 and 106. The PNC or domain controller configures the nodes 109, 112, 115, and 118 in network 100 and monitors physical topology of network 100. The PNC or domain controller may be configured to communicate the physical topology of network 100 to the MDSC or super controller.

The central controller 140 comprising both the MDSCs or super controllers and PNCs or domain controllers of network 100 together control the nodes 109, 112, 115, and 118 based on the customer's requests that are received by the CNC 130. In an embodiment, the central controller 140 may be part of a SDN controller in an SDN. The CNC 130 interfaces with the MDSC or super controller in the central controller 140 over a CNC/MDSC interface (CMI) interface 157, and the central controller 140 interfaces with the nodes 109, 112, 115, and 118 over a southbound interface. As should be appreciated, any number of CNCs 130, MDSCs, super controllers, PNCs, and domain controllers may be included in network 100.

The network 100 is configured to provide tunnels for carrying traffic from the CE 103 to the CE 106 based on requests for creating tunnels sent by applications 151-154. A method for tunneling may comprise encapsulating original packets using an encapsulation protocol and sending the encapsulated packet from an ingress PE node 109 to an egress PE node 115. The egress PE node 115 remove headers of the encapsulated packet that were added (encapsulated) onto the packets by the ingress PE node 109 and forwards the original packet to a CE 106. As a result, tunneled packets are transported as normal IP packets over the delivery network or infrastructure network 100, where the outer IP source address is an ingress PE node 109 address and the outer IP destination address is an egress PE node 115 address. Tunnel mechanisms enable users or third parties to establish a private network over the Internet or without the infrastructure network awareness.

Applications 151-154 associated with the same VLANs 143A-N or 146A-N may have different service policies 180. Different service policies 180 may be associated with different tunnels based on the network requirements specified in the service policies 180. However, in the context of EVPL over OTN, different tunnels are typically not created for different applications 151-154 that share the same VLAN 143A-N or 146A-N even though the different applications 151-154 have different service policies 180. For example, application 151 in VLAN 143A may have a different service policy 180 for latency requirements than application 152 in VLAN 143A. However, network 100 would typically not be able to create a different tunnel for application 151 and application 152 because both applications 151 and 152 are associated with the same VLAN 143A.

Disclosed herein are embodiments directed to creating a different tunnel for different applications 151-154 executed in the same VLAN 143A-N or 146A-N based on a service policy 180 for each of the applications 151-154. In an embodiment, the CNC 130 obtains VLAN information from CEs 103 and 106 over link 160. Link 160 may be similar to links 121 and 124. For example, CE 103 sends VLAN information to the CNC 130 including a VLAN ID 172 for each of VLANs 143A-N, application IDs 176 for each of the applications 151-152 running on each of VLANs 143A-N, and service policies 180 for each of the applications 151-152. Similarly, CE 106 sends VLAN information to CNC 130 including a VLAN ID 172 for each of VLANs 146A-N, application IDs 176 for each of the applications 153-154 running on each of VLANs 146A-N, and service policies 180 for each of the applications 153-154. As should be appreciated, CEs 103 and 106 may send other types of information to CNC 130.

In an embodiment, CNC 130 may store mappings of the VLAN information received from each of the CEs 103 and 106. For example, CNC 130 may store a mapping of a VLAN ID 172 of VLAN 143A, an application ID 176 for application 151, and a service policy 180 for application 151. Similarly, CNC 130 may store a mapping of a VLAN ID 172 of VLAN 143A, an application ID 176 for application 152, and a service policy 180 for application 152. CNC 130 may also store a mapping of a VLAN ID 172 for VLAN 146A, an application ID 176 for application 153, and a service policy 180 for application 153. Similarly, CNC 130 stores a mapping of the VLAN ID 172 for VLAN 146A, an application ID 176 for application 154, and a service policy 180 for application 154. CNC 130 is configured to store similar mappings for each of the applications 151-154 running on each of the VLANs 143A-N or 146A-N based on the VLAN information received from CEs 103 and 106.

In an embodiment, CNC 130 is configured to send a tunnel creation request 170 comprising application specific VLAN information to the central controller 140 such that the central controller 140 establishes a tunnel specifically for the application. In some embodiments, the CNC 130 is configured to send the tunnel creation request 170 in response to receiving a message from CE 103 indicating that an application 151 or 151 executed at one of VLANs 143A-N is requesting a tunnel between two endpoints. In some embodiments, the CNC 130 is configured to send the tunnel creation request 170 in response to receiving the VLAN information from VLANs 143A-N and 146A-N. The tunnel creation request 170 may be sent to the central controller 140 at any time after the CNC 130 receives the VLAN information for the applications 151-154 requesting a tunnel 163 such that the central controller 140 may determine a tunnel 163 for each application 151-154 executed at VLANs 143 and 146.

In an embodiment, the tunnel creation request 170 comprises the mapping of the VLAN ID 172 of VLAN 143A, the application ID 176 of application 152, and the service policy 180 for application 152 to the central controller 140. The central controller 140 may be configured to determine a first tunnel 163A for application 152 based on the service policy 180 for application 152 instead of solely on the VLAN ID 172. The service policy 180 may indicate network requirements that are to be satisfied for application 152 to be executed. The central controller 140 may compute the first tunnel 163A that satisfies the service policy 180 for application 152 based on available resources in network 100. In some embodiments, central controller 140 may also use network restraints, such as, for example, Quality of Service (QoS), bandwidth, and so on, to determine the first tunnel 163A. The first tunnel 163A may be a traffic engineering (TE) end-to-end tunnel between ingress PE node 109 and egress PE node 115 to create an EVN between CE 103 and CE 106. As shown in FIG. 1, the first tunnel 163A includes a path consisting of nodes 109, 112, and 115.

CNC 130 may also send a tunnel creation request 170 comprising the mapping of the VLAN ID 172 of VLAN 143A, the application ID 176 of application 151, and the service policy 180 for application 151 to the central controller 140. Central controller 140 may be configured to determine a second tunnel 163B for application 151 based on the service policy 180 for application 151 instead of solely on the VLAN ID 172. The service policy 180 may indicate network requirements that are to be satisfied for application 151 to be executed. The central controller 140 may compute the second tunnel 163B that satisfies the service policy 180 for application 151 based on available resources in network 100. In some embodiments, central controller 140 may also use network restraints to determine the second tunnel 163B. The second tunnel 163B may be a TE end-to-end tunnel between ingress PE node 109 and egress PE node 115 to create another EVN between CE 103 and CE 106. As shown in FIG. 1, the second tunnel 163B includes a path consisting of nodes 109, 112, 118, and 115.

In an embodiment, the central controller 140 establishes the tunnel 163A or 163B (also referred to herein as tunnel 163) based on the tunnel creation request 170. The central controller 140 may transmit information regarding the tunnel 163 to the ingress PE node 109 based on the established tunnel 163. The central controller 140 may transmit a message to the CNC 130 indicating whether a tunnel 163 that meets the service policy 180 has been established. The central controller 140 may generate a tunnel ID 190 and transmit the tunnel ID 190 back to the CNC 130. In this case, the tunnel ID 190 may be transmitted in the message sent to the CNC 130. In an embodiment, the central controller 140 may not generate the tunnel ID 190 rather the CNC 130 generates and stores the tunnel ID 190 after receiving the message from the central controller 140.

In operation, when the ingress PE node 109 receives a data packet from the CE 103, the ingress PE node 109 analyzes the data packet to determine a tunnel on which to transport the data packet. For example, suppose ingress PE node 109 receives data packet 183 comprising the VLAN ID 172 and the application ID 176 corresponding to application 151. In such a case, the central controller 140 has previously determined the tunnel 163 for application 151 based on a service policy 180 associated with application 151 and instructed the ingress PE node 109 to establish the tunnel 163 for application 151 based on the service policy 180 associated with application 151. Ingress PE node 109 determines to use the second tunnel 163B which corresponds to application 151 for data packet 183. As another example, suppose ingress PE node 109 receives data packet 183 comprising the VLAN ID 172 and the application ID 172 corresponding to application 152. In such a case, central controller 140 has also previously instructed the ingress PE node 109 to establish a tunnel for application 152 based on a service policy 180 associated with application 152. Ingress PE node 109 determines to use the first tunnel 163A which corresponds to application 152 for data packet 183.

In some embodiments, the VLAN ID 172 and the application ID 176 may be included in an inner header of the data packet 183 separate from the payload 185 of the data packet 183. In an embodiment, the VLAN ID 172 and the application ID 176 may be included as metadata in a field of the data packet 183. After the ingress PE node 109 determines the tunnel on which to transport the data packet 183, the ingress PE node 109 may replace an outer path label with a path label of a next hop of the tunnel, which would be node 112 for both the first tunnel 163A and the second tunnel 163B. Similarly, after the node 112 receives the data packet, node 112 also replaces the outer path label with a path label of a next hop of the tunnel. This forwarding is repeated at each node along the tunnel until the data packet 183 arrives at CE 106. When the PE egress node 115 receives the data packet 183, the PE egress node 115 pops or removes the outer path label and the inner label and forwards the data packet 183 to the CE 106. The network 100 may provide any number of tunnels using similar mechanisms.

Figure 2:
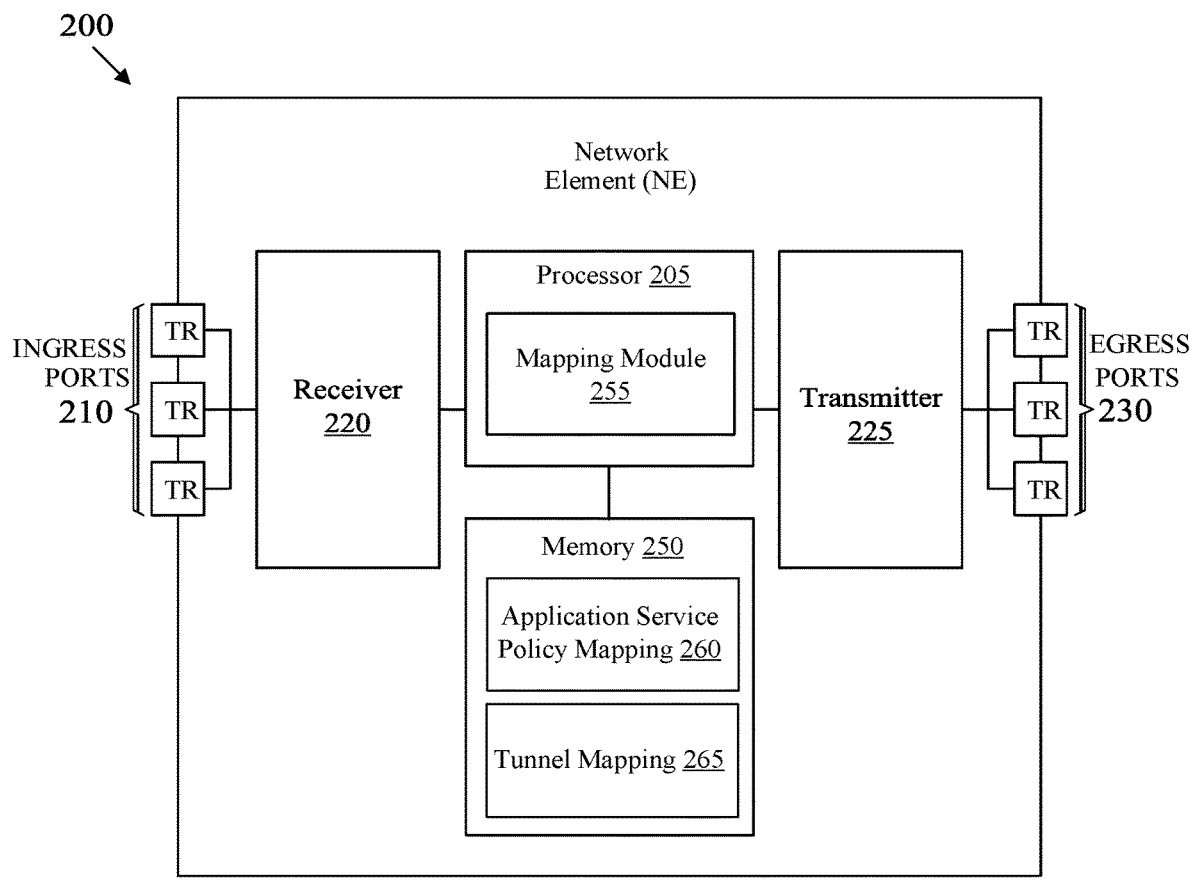
FIG. 2 is a diagram of an embodiment of a network element (NE) in the network.

FIG. 2 is a diagram of an embodiment of a NE 200 in the network 100. For instance, the NE 200 may be a CE 103 or 106, nodes 109, 112, 115, and 118, CNC 130, or a central controller 140. The NE 200 may be configured to implement and/or support the application service policy specific tunneling mechanisms described herein. The NE 200 may be implemented in a single node or the functionality of NE 200 may be implemented in a plurality of nodes. One skilled in the art will recognize that the term NE encompasses a broad range of devices of which NE 200 is merely an example. The NE 200 is included for purposes of clarity of discussion, but is in no way meant to limit the application of the present disclosure to a particular NE embodiment or class of NE embodiments. At least some of the features and/or methods described in the disclosure may be implemented in a network apparatus or module such as an NE 200. For instance, the features and/or methods in the disclosure may be implemented using hardware, firmware, and/or software installed to run on hardware. As shown in FIG. 2, the NE 200 comprises one or more ingress ports 210 and a receiver unit (Rx) 220 for receiving data, at least one processor, logic unit, or central processing unit (CPU) 205 to process the data, a transmitter unit (Tx) 225 and one or more egress ports 230 for transmitting the data, and a memory 250 for storing the data.

The processor 205 may comprise one or more multi-core processors and be coupled to a memory 250, which may function as data stores, buffers, etc. The processor 205 may be implemented as a general processor or may be part of one or more application specific integrated circuits (ASICs) and/or digital signal processors (DSPs). The processor 205 may comprise a mapping module 255, which may perform processing functions of the CNC 130 or the central controller 140, and implement methods 500, 600, 700, 1000, and 1100, as discussed more fully below, and/or any other method discussed herein. As such, the inclusion of the mapping module 255 and associated methods and systems provide improvements to the functionality of the NE 200. Further, the mapping module 255 effects a transformation of a particular article (e.g., the network) to a different state. In an alternative embodiment, mapping module 255 may be implemented as instructions stored in the memory 250, which may be executed by the processor 205.

The memory 250 may comprise a cache for temporarily storing content, e.g., a random-access memory (RAM). Additionally, the memory 250 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof. The memory 250 may be configured to store routing databases. In an embodiment, the memory 250 may comprise application service policy mapping 260 and tunnel mapping 265. In an embodiment, application service policy mapping 260 comprises the VLAN information including VLAN IDs 172, application IDs 176, and service policies 180. The tunnel mapping 265 may further include a tunnel ID 190 corresponding the tunnels 163 created for different applications 151-154 in the network 100.

When NE 200 is the CNC 130, the Rx 220 receives VLAN information from the CEs 103 and 106. The mapping module 255 executed by the processor 205 maps the VLAN information based on the VLAN ID 172, application ID 176, and service policy 180. The mappings of the VLAN information are stored in the application service policy mapping 260 of memory 250. The processor 205 generates a tunnel creation request 170, and the Tx 225 transmits the tunnel creation request 170 to the central controller 140. The Rx 220 receives a message from the central controller 140 indicating whether a tunnel 163 that satisfies the service policy 180 is established. The Rx 220 may receive the tunnel ID 190 from the central controller 140, or the processor 205 may generate the tunnel ID 190. The tunnel ID 190 may be stored in the tunnel mapping 265 of the memory 250.

When NE 200 is central controller 140, the Rx 220 receives the tunnel creation request 170 from the CNC 130. The mapping module 255 executed by the processor 205 computes the tunnel 163 that satisfies the service policies 180 indicated in the tunnel creation request 170. The Tx 225 transmits information regarding the computed tunnel 163 to an ingress PE node 109. The Tx 225 may also transmit a message indicating whether the tunnel 163 has been successfully established to the CNC 130. In some embodiments, the mapping information between the VLAN ID 172, application ID 176, and service policy 180 may be stored in the application service policy mapping 260 of the memory 250 of the central controller 140. The tunnel IDs 190 may also be stored in the tunnel mapping 265 of the memory 250 of the central controller 140.

It is understood that by programming and/or loading executable instructions onto the NE 200, at least one of the processor 205 and/or memory 250 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC in a particular machine or apparatus, likewise a computer that has been programmed and/or loaded with executable instructions may be viewed as a particular machine or apparatus.

Figure 3:
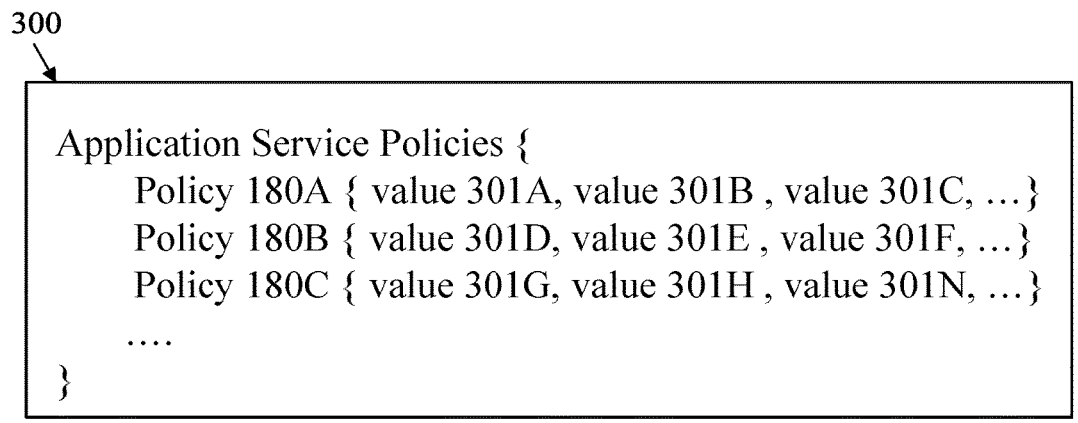
FIG. 3 is an illustration of a catalog of service policies for various applications.

FIG. 3 is an illustration of a catalog 300 of service policies 180 for various applications 151-154. The catalog 300 of service policies 180 may include multiple service polices 180A-C (shown as policy 180A-C in FIG. 3). Each of the service policies 180A-C may be associated with various different values 301A-N for each service policy 180. Examples of these service policies 180 will be further described with reference to FIG. 5. As shown in FIG. 3, service policy 180A is associated with multiple different values 301A-C. For example, if service policy 180A corresponds to a latency policy, then the multiple different values 301A-C may correspond to different latency measurements that may be included in the service policy 180A. Similarly, service policies 180B and 180C are also associated with different values 301D-N.

In an embodiment, the catalog 300 of service policies 180 may be a predefined catalog that is stored at the CNC 130, and each of the service policies 180 received at the various CEs 103 and 106 may match the service policies 180A-C specified in the catalog 300. In this embodiment, a service policy 180 specified by an application 151-154 may define one of the predefined values 301A-N that corresponds to that service policy 180 in the catalog 300. For example, suppose catalog 300 includes a service policy 180A for a bit rate. The service policy 180A for bitrate may include two values 301A-B representing either a constant bit rate or a variable bit rate. In this case, a service policy 180 specified by an application 151-154 that defines a bit rate may include one of the two values 301A-B specifying a constant bit rate or a variable bit rate.

In an embodiment, the catalog 300 may not be a predefined catalog but rather a programmable catalog that can be updated as necessary by different customers. For example service policies 180 received from the various CEs 103 and 106 may specify values 301A-N for the service policies 180 that do not necessarily have to conform to any predefined catalog.

Figure 4:
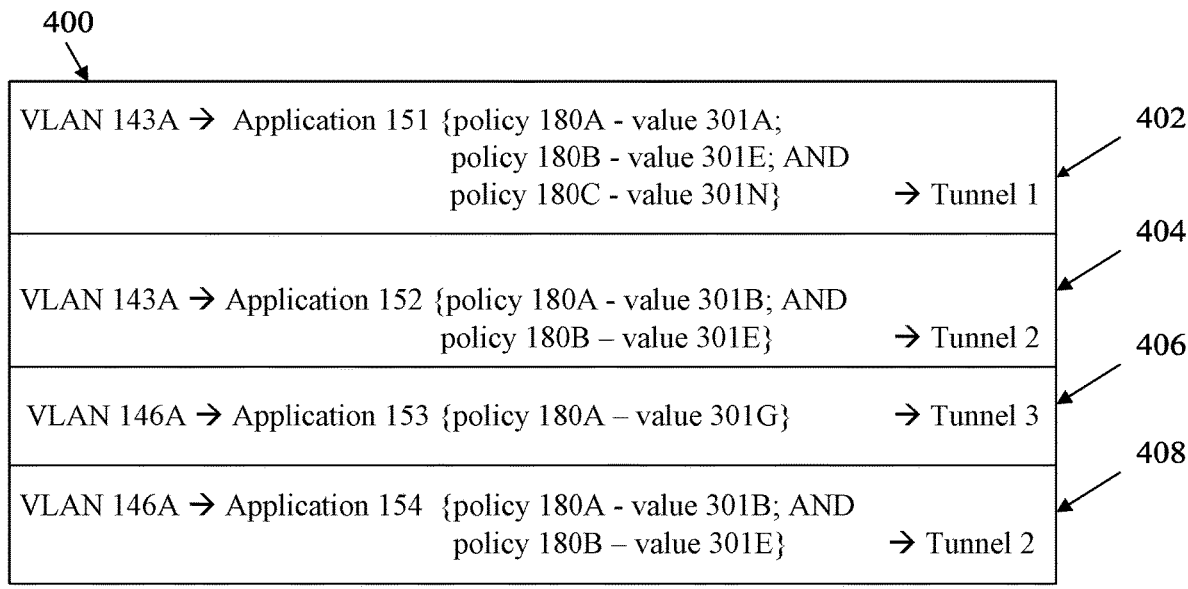
FIG. 4 is an illustration of how various VLAN identifiers (IDs) and service policies may be used to determine a tunnel for a given application.

FIG. 4 is an illustration 400 of how various VLAN IDs 172 and service policies 180 may be used to determine a tunnel 163 for a given application 151-154. As shown in FIG. 4, the VLAN 143A may execute application 151, which has three different service policies 180 having different values 301 corresponding to the service policies 180. Application 151 has a service policy 180A defining a value 301A, a service policy 180B defining a value 301E, and a service policy 180C defining a value 301N. Therefore, for data packets associated with application 151, three different network requirements corresponding to the service policies 180A-C may be used to establish a tunnel 163A that satisfies service policies 180A-C. As shown in box 402, the tunnel 163A established for application 151 may be identified by a tunnel ID 190 of "1."

The VLAN 143A may also execute application 152, which has two different service policies 180 having different values 301 corresponding to the service policies 180. Application 152 has a service policy 180A defining a value 301B, and a service policy 180B defining a value 301E. Therefore, for data packets associated with application 152, two different network requirements corresponding to the service policies 180A-B may be used to establish a tunnel 163B that satisfies service policies 180A-B, which are different than the service policies 180A-C for application 151. As shown in box 404, the tunnel 163B established for application 152 may be identified by a tunnel ID 190 of "2."

The VLAN 146A may execute application 153, which only has one service policy 180A defining a value 301G. Therefore, for data packets associated with application 153, only one network requirement corresponding to service policy 180A may be used to establish a tunnel 163C that satisfies service policy 180A, which is different from the services policies 180A-C for application 151 and service policies 180A-B for application 152. As shown in box 402, the tunnel 163C established for application 153 may be identified by a tunnel ID 190 of "3."

The VLAN 146A may also execute application 154, which has two different service policies 180 that each have different values 301 corresponding to the service policies 180. Application 154 is similar to application 152 in that application 154 has a service policy 180A defining a value 301B, and a service policy 180B defining a value 301E. Applications 152 and 154 operate under similar service policies 180A-B and thus, can use the same tunnel instance 163B having the same tunnel ID 190 of "2," as shown in box 408.

According to some embodiments, CNC 130 may be configured to determine which applications 151-154 have the same service policies 180 before instructing the central controller 140 to generate a tunnel 163 for the applications 151-154. Applications that have identical service policies 180 may use the same tunnel 163 in network 100, thereby conserving network resources while also maintaining the network requirements for each of the applications 151-154.

FIG. 5 is a table 500 illustrating examples of tunnel assignments for applications 151-154 having different service policies 180 and corresponding values 301. In an embodiment, table 500 stores VLAN and tunnel information for network 100. In an embodiment, table 500 may be stored at the CNC 130 and/or the central controller 140. For example, the information in table 500 may be stored in a memory 250 of the CNC 130 and/or the central controller 140. Table 500 includes entries 550A-N for various combinations of VLANs 143A-N and 146A-N and applications 151-154 that define service policies 180 and have an associated tunnel 163.

Table 500 includes a VLAN ID column 503, an application ID column 506, and a service policy column 509, and a tunnel ID column 521. The VLAN ID column 503 includes the VLAN ID 172 for one or more VLANs 143A-N. For example, CNC 130 may obtain VLAN information from CE 103 where the VLAN information comprises information identifying and describing VLANs 143A-N associated with CE 103. For example, the VLAN information may include the VLAN IDs 172 that are shown in VLAN ID column 503. The application ID column 506 includes the application IDs 176 for one or more applications 151-154 executed at the respective VLAN 143 identified by the VLAN ID 172 shown in the VLAN ID column 503. For example, the VLAN information obtained from CE 103 may include the application IDs 176 for applications 151-154 that are executable at one or more of VLANs 143A-N associated with CE 103.

The service policy column 509 includes sub-columns 512, 515, and 518 for various service policies 180 that may be specified for a given application 151-154. As shown in FIG. 5, table 500 includes three example service policies 180 including latency level, layer 0 (L0) path sharing policy, and a path protection level. Sub-column 512 defines the value 301 for the latency level service policy 180, sub-column 515 defines the value 301 for the L0 path sharing service policy 180, and sub-column 518 defines the value 301 for the path protection level service policy 180. In an embodiment, the service policies 180 shown in sub-columns 512, 515, and 518 are obtained from the CE 103 or 106.

While only three example service policies 180 are shown in FIG. 5, an application 151-154 may define any different type of service policy 180 associated with a network requirement for executing that application 151-154. For example, service policies 180 may include a bandwidth specification, which may define a value 301 for a minimum bandwidth, maximum bandwidth, and/or permitted bandwidth range for a tunnel 163 for an application 151-154. Service policies 180 may include a throughput specification, which may define a value 301 for a throughput in a tunnel 163 of network 100. A category for service policies 180 may be associated with tunnel isolation. For example, a service policy 180 may indicate whether a tunnel 163 is physically isolated, or given a separate wavelength, or not. Another service policy 180 may indicate how to re-route a tunnel 163 upon tunnel failure. For example, a service policy 180 may instruct to delegate re-routing of a tunnel 163 to the network without informing the CNC 130. A service policy 180 may also instruct to inform the CNC 130 of the tunnel failure so that the CNC 130 instantiates a new tunnel 163 after tunnel failure. Service policies 180 may also include values 301 for other service policies 180, such as jitter, error rate, delay, bit rate, and/or other types of network performance requirement measurements as should be appreciated.

Tunnel ID column 521 includes a tunnel ID 190 for a tunnel 163 established for an application 151-154 having a unique service policy 180. The tunnel ID 190 may be an ID that uniquely identifies a tunnel 163 that satisfies a corresponding service policy 180. In an embodiment, the tunnel ID 190 may be generated by the CNC 130 after receiving a message from central controller 140 indicating that the tunnel 163 for a service policy 180 has been successfully established. The tunnel ID 190 may also be generated by the central controller 140 and then sent to CNC 130 after the tunnel 163 for a service policy 180 has been successfully established.

As shown in FIG. 5, entries 550A-550N show examples of how tunnels 163 are assigned or created for applications 151-154 having a unique service policy 180. Entry 550A corresponds to an application, such as application 151, executed at VLAN 143A. The VLAN ID 172 for entry 550A may be "143A," and the application ID 176 for application 151 may be "151." A service policy 180 for application 151 executed at VLAN 143A may specify that the latency level for the tunnel 163 created for application 151 may be less than 50 milliseconds (ms). Another service policy 180 for application 151 executed at VLAN 143A may specify that L0 path sharing is allowed. Another service policy 180 for application 151 executed at VLAN 143A may specify that path protection should be enabled ("1+1") such that the tunnel 163 should be re-established upon failure. A tunnel 163 established for application 151 at VLAN 143A may be identified by the tunnel ID 190 of "A."

Entry 550B corresponds to an application, such as application 152, executed at VLAN 143A. The VLAN ID 172 for entry 550B may also be "143A," and the application ID 176 for application 152 may be "152." A service policy 180 for application 152 executed at VLAN 143A may specify that the latency level for the tunnel 163 created for application 152 should not be considered when determining a tunnel 163 for application 152. Another service policy 180 for application 152 executed at VLAN 143A may specify that L0 path sharing is allowed. Another service policy 180 for application 152 executed at VLAN 143A may specify that path protection may not be enabled (1:0) and that the tunnel 163 may be recovered when possible upon failure. A tunnel 163 established for application 152 at VLAN 143A may be identified by the tunnel ID 190 of "B," which is different from the tunnel ID 190 of application 151 because application 152 and application 151 have different service policies 180.

Entry 550C corresponds to an application, such as application 151, executed at VLAN 146C. The VLAN ID 172 for entry 550C may be "146C," and the application ID 176 for application 151 may be "151," which is the same as application 151 in entry 550A. A service policy 180 for application 151 executed at VLAN 146C may specify that the latency level for the tunnel 163 created for application 151 may be less than 50 ms. Another service policy 180 for application 151 executed at VLAN 146C may specify that L0 path sharing is allowed. Another service policy 180 for application 151 executed at VLAN 146C may specify that path protection may be enabled. A tunnel 163 established for application 151 at VLAN 146C may be identified by the tunnel ID 190 of "A" even though application 151 is executed at different VLANs 143A and 146C. In some embodiments, application 151 executed at different VLANs 143A and 146C may then use the same tunnel 163.

Entry 550N corresponds to an application, such as application 154, executed at VLAN 146C. The VLAN ID 172 for entry 550N is also "146C," and the application ID 176 for application 153 may be "153." A service policy 180 for application 154 executed at VLAN 146C may specify that the latency level for the tunnel 163 created for application 154 should not be considered when determining a tunnel 163 for application 154. Another service policy 180 for application 154 executed at VLAN 146C may specify that L0 path sharing is not allowed. Another service policy 180 for application 154 executed at VLAN 146C may specify that path protection may be enabled. A tunnel 163 established for application 154 at VLAN 146C may be identified by the tunnel ID of "C," which is different from the tunnel ID of applications 151-152 because application 154 and applications 151-152 have different service policies 180.

As shown in FIG. 5, applications 151-154 having the same service policies 180 may use the same tunnel 163 since the tunnel satisfies the network requirements specified by the application 151-154 in the service policies 180. If a tunnel 163 for application 151 at VLAN 143A is created before the tunnel 163 for application 151 at VLAN 146C, then a new tunnel 163 need not be established for application 151 at VLAN 146C. CNC 130 or central controller 140 may identify tunnel ID "A" as being established for the application 151. Application service policy aware tunneling mechanisms enable more precise tunnel establishment methods for sophisticated applications while preserving resources across network 100 when possible by reusing tunnels for applications with the same service policies 180.

While only four entries 550A-N are shown, it should be appreciated that any number of entries may be included in table 500 corresponding to the different applications 151-154 and service policies 180 available in network 100. While each entry 550A-N only shows three service policies 180 associated with an application ID 176, it should be appreciated that any number of service policies 180 may be associated with an application ID 176 and an application 151-154. While the mappings of VLAN IDs 172, application IDs 176, service policies 180, and tunnel IDs 190 are shown in FIG. 5 in the form of a table, it should be appreciated that table 500 is an abstraction of the information that is stored at either the CNC 130 and/or the central controller 140. In this way, the mappings of VLAN IDs 172, application IDs 176, service policies 180, and tunnel IDs 190 may be otherwise stored in any other data structure or in a distributed manner.

Figure 6:
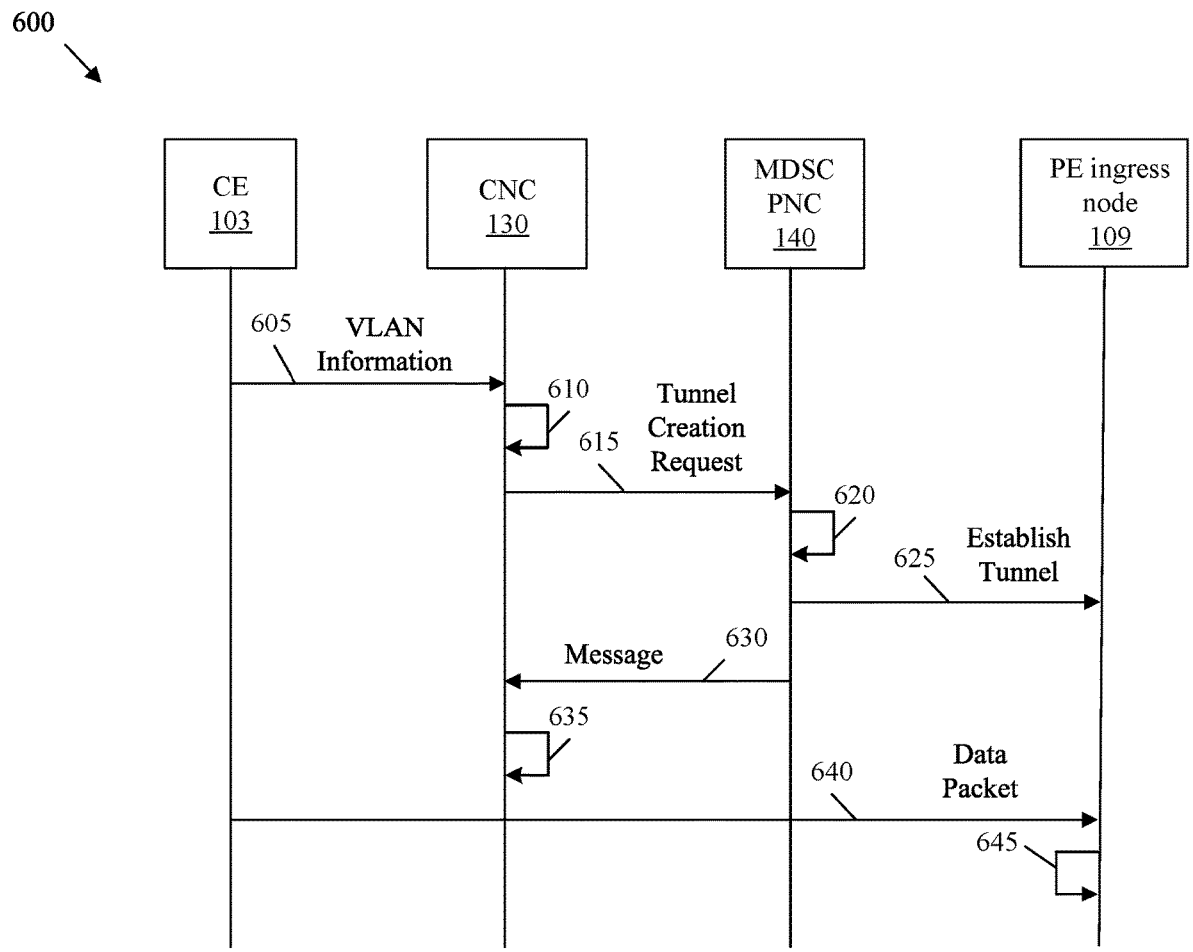
FIG. 6 is a protocol diagram illustrating an embodiment of a method for creating tunnels in the network based on a service policy specific to the application.

FIG. 6 is a protocol diagram illustrating an embodiment of a method 600 for creating tunnels 163 in a network 100 based on a service policy 180 specific to the application 151-154. The method 600 is implemented by a CE 103, a CNC 130, a central controller 140, and a ingress PE node 109. The method 600 is initiated when VLANs 143A-N attach to CE 103, VLANs 146A-N attach to CE 106, applications 151-152 initiate at VLAN 143A, and applications 153-154 initiate at VLAN 146A. At step 605, CE 103 transmits VLAN information to the CNC 130. For example, Tx 225 transmits the VLAN information to the CNC 130. In an embodiment, the VLAN information may include information associated with the L2SM, as described in the L2SM document. In an embodiment, the VLAN information may include the VLAN IDs 172 of the VLANs 143A-N and 146A-N corresponding to CE 103 and 106, respectively. In an embodiment, the VLAN information may also include the application IDs 176 of the applications 151-154 executable or executing at each of VLANs 143A-N and 146A-N. In an embodiment, the VLAN information may also include the service policies 180 corresponding to each of the application IDs 176 of applications 151-154. At step 610, CNC 130 stores the VLAN information into mappings in a manner similar to that shown in table 500 of FIG. 5. The CNC 130 organizes the VLAN information so that service policies 180 for each of the applications 151-154 at each of VLANs 143A-N and 146A-N are mapped out. For example, the VLAN information may be stored in application service policy mapping 260 at memory 250 of CNC 130.

At step 615, a tunnel creation request 170 may be transmitted to the central controller 140. For example, Tx 225 of CNC 130 transmits the tunnel creation request 170 to the central controller 140. The tunnel creation request 170 may be generated at various times as specified by a customer or an operator of network 100. For example, the tunnel creation request 170 may be generated upon initiation of a specific application 151-154, after receiving a request by an application 151-154 for a tunnel 163, upon receiving the VLAN information from CEs 103 and 106, or at certain predefined times as specified by a tunnel management schedule. The tunnel creation request 170 may include a VLAN ID 172 of a VLAN 143A-N or VLAN 146A-N, an application ID 176 of an application 151-154, and one or more service policies 180 associated with the application 151-154. For example, the tunnel creation request 170 may be for application 151 and may include "143A" as the VLAN ID, "151" as the application ID, and may include the service policies 180 shown in entry 550A of table 500. The tunnel creation request 170 may be a request for the central controller 140 to create a tunnel 163 that satisfies the service policies 180 specified in the tunnel creation request 170.

In an embodiment, the CNC 130 may determine whether a tunnel 163 is already created for an application 151 with the service policies 180 that would be included in the tunnel creation request 170. Referring back to FIG. 5, table 500 shows that application 151 executed at different VLANs 143A and 146C operate according to the same service policies 180 and may use the same tunnel 163 to transmit data traffic. CNC 130 may determine that a tunnel 163 has already been created for application 151. In such a case, CNC 130 may identify the tunnel ID 190 for the tunnel 163 that was created for application 151 and assign that tunnel ID 190 for application 151 executed at the different VLAN. In this case, the tunnel creation request 170 may indicate the tunnel ID 190 of the tunnel 163. If a tunnel 163 has not already been created for an application 151-154 with the service policies 180 that would be included in the tunnel creation request 170, then the tunnel creation request 170 may be a request for the central controller 140 to compute or determine a tunnel 163 for the application 151-154 that satisfies the service policies 180 included in the tunnel creation request 170.

At step 620, the central controller 140 determines a tunnel 163 for the application 151-154 that satisfies the service policies 180 included in the tunnel creation request 170. For example, the mapping module 255 in the processor 205 determines the tunnel 163 for the application 151-154. If a tunnel 163 is already created for an application 151-154 with the service policies 180 included in the tunnel creation request 170, then the tunnel creation request 170 includes a tunnel ID 190 of the tunnel 163 to use. In this case, at step 625, the central controller 140 instructs the ingress PE node 109 to use the tunnel 163 with the tunnel ID 190 for data packets including the application ID 176 that is also included in the tunnel creation request 170. If a tunnel 163 has not yet been created for an application 151-154 with the service policies 180 included in the tunnel creation request 170, then the central controller 140 computes a new tunnel 163 that satisfies the service policies 180 specified in the tunnel creation request 170 based on available resources and network constraints in the network 100. In this case, at step 625, the central controller 140 instructs the ingress PE node 109 to establish the newly computed tunnel 163 for data packets including the application ID 176 that is also included in the tunnel creation request 170.

At step 630, the central controller 140 sends a message back to the CNC 130 indicating whether the tunnel 163 that satisfies the service policies 180 for the application 151-154 specified by the application ID 176 has been successfully established. For example, the Tx 225 of the central controller 140 transmits the message back to the CNC 130. For example, the message sent back to the CNC 130 may be an acknowledge (ACK) or a negative ACK (HACK) message.

In an embodiment, the central controller 140 generates the tunnel ID 190 corresponding to a newly created tunnel 163 and sends the tunnel ID 190 back to the CNC 130 in the message. In an embodiment, the central controller 140 stores the VLAN information in a manner similar to how the CNC 130 stores the VLAN information. In an embodiment, the central controller 140 may update the stored VLAN information to include the tunnel ID 190 of the newly created tunnel 163.

At step 635, the CNC 130 may determine the tunnel ID 190 after receiving the message from the central controller 140 indicating that the tunnel 163 has been successfully established in response to the tunnel creation request 170. For example, the mapping module 255 in the processor 205 may determine the tunnel ID 190. In an embodiment, the CNC 130 may update the VLAN information stored at the CNC 130 to include the tunnel ID 190 after receiving the message at step 630. The updated information may be stored at the tunnel mapping 265 of the memory 250.

At step 640, data packets 183 may be transmitted from the CE 103 to the ingress PE node 109. For example, the Tx 225 of CE 103 may transmit data packets 183 to the ingress PE node 109. The data packets 183 may include the VLAN ID 172, application ID 176, and payload 185. At step 645, the ingress PE node 109 may obtain the application ID 176 from the data packets 183 and determine the tunnel 163 to transmit the data packet 183 on based on the application ID 176. For example, the ingress PE node 109 may store a mapping of a tunnel ID 190 that corresponds to the application ID 176. For example, the mapping module 255 in the processor 205 is configured to determine the tunnel 163 based on the tunnel ID 190 that maps to the application ID 176. The ingress PE node 109 may send data packets 183 coming from the same VLAN 143A-N or 146A-N through different tunnels 163 based on the service policies 180 of the applications 151-154 from which the data packets 183 originate.

Figure 7:
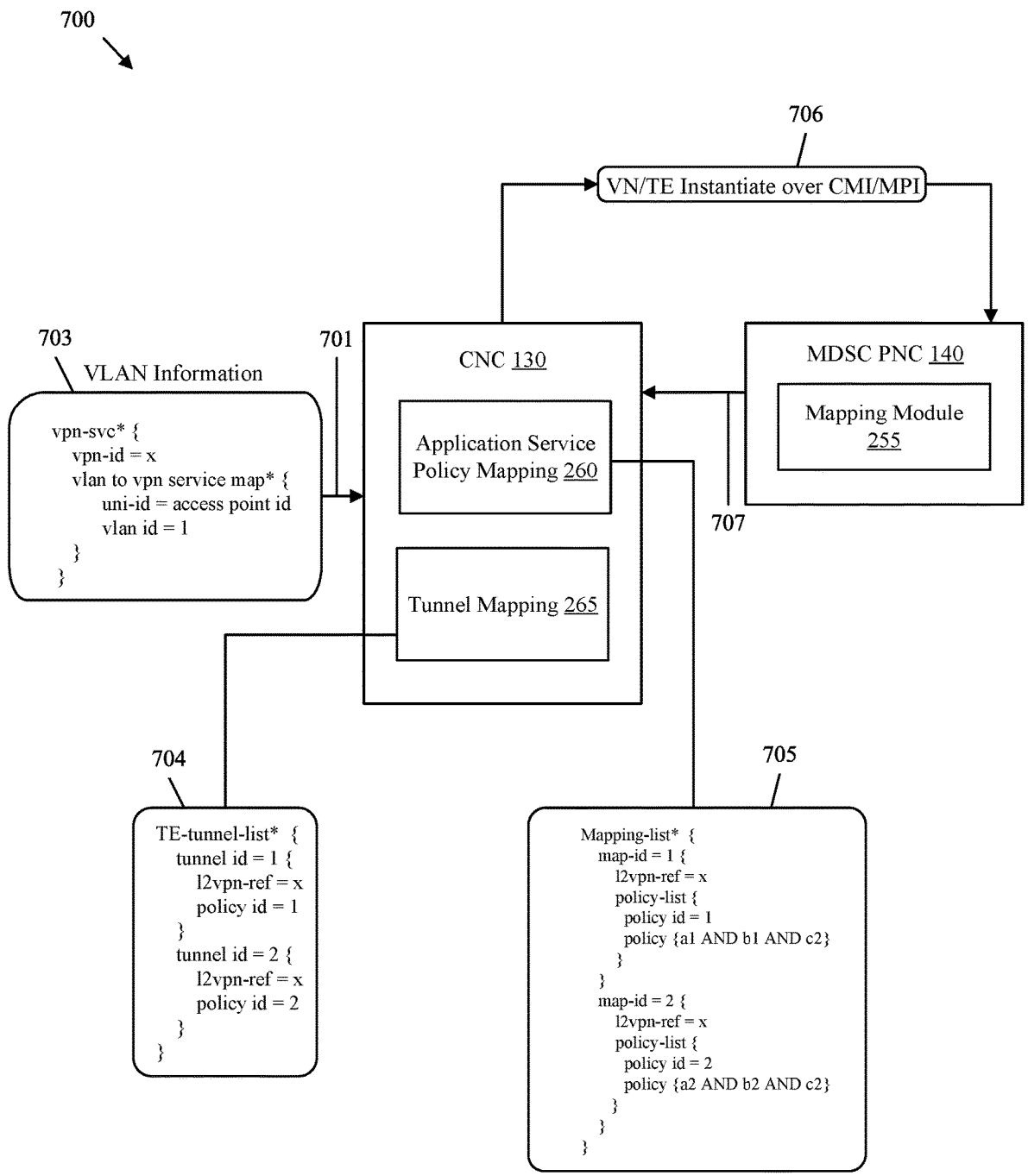
FIG. 7 is a diagram illustrating an embodiment of a method for creating tunnels in the network based on a service policy including data models representing information that is received by and stored at the Customer Network Controller (CNC).

FIG. 7 is a diagram illustrating an embodiment of a method 700 for creating tunnels 163 in a network 100 based on a service policy 180. The method 700 is similar to method 600 except that method 700 illustrates a portion of method 600 implemented by the CNC 130 and central controller 140. Method 700 includes data models 703-705 representing information that is received by and stored at the CNC 130.

At step 701, the CNC 130 receives the VLAN information in the form of the data model 703 for carrying the VLAN information. For example, the VLAN information 703 is similar to the VLAN information transmitted at step 605 of FIG. 6. The VLAN information 703 is a data model consistent with the data modeling language proposed in L2SM, as described in the L2SM document. In an embodiment, the data model 703 for carrying the VLAN information defines VLAN IDs 172, application IDs 176, and service policies 180 associated with one or more CEs 103 and 106. The data model 703 for carrying the VLAN information may further included IDs for the VPNs associated with a customer, access point IDs, and/or other information that may be sent by CEs 103 and 106.

In an embodiment, the VLAN information described in step 701 is stored in the application service policy mapping 260. In some embodiments, the CNC 130 stores the VLAN information in the application service policy mapping 260 in the form of the data model 705. The data model 705 for storing the application service policy mapping information 260 may include mapping IDs, reference numbers for VPNs, VLAN IDs 172, application IDs 176, IDs of the service policies 180, values 301 for the service policies 180, and/or other information that identifies and describes applications 151-154 and service policies 180.

At step 706, CNC 130 may transmit a tunnel creation request 170 to central controller 140 where the tunnel creation request 170 is a request for a virtual network (VN) TE tunnel instantiation over the CMI interface 157 and an MDSC to PNC interface. The tunnel creation request 170 is similar to that which is transmitted at step 615 of FIG. 6. Once the central controller 140 receives the tunnel creation request 170, the mapping module 255 of the central controller 140 establishes a tunnel 163 based on the tunnel creation request 170 in a manner similar to that described in step 620 of FIG. 6.

At step 707, after establishing the tunnel 163 in response to the tunnel creation request 170, the central controller 140 transmits a message to the CNC 130 indicating whether the tunnel 163 has been successfully established. The message may be similar to the message described in step 630 of FIG. 6. In an embodiment, the central controller 140 transmits a tunnel ID 190 uniquely identifying the tunnel 163 established for the tunnel creation request 170 in the message. In an embodiment, the CNC 130 determines a tunnel ID 190 after receiving the message. The CNC 130 stores the tunnel ID 190 in relation to the application IDs 176 and service policies 180 associated with the tunnel creation request 170 in the tunnel mapping 265. In some embodiments, the CNC 130 stores the tunnel ID 190 in the form of the data model 704. The data model 704 for storing the tunnel IDs 190 may include the tunnel IDs 190, IDs of the service policies 180, reference numbers for VPNs, and/or other information that identifies and describes tunnels 163 generated for an application 151-154.

FIG. 8 is a read-write YANG data model 800 defining how service policies 180 are mapped to applications 151-154 and tunnels 163 at the CNC 130 or the central controller 140. The read-write YANG data model 800 is consistent with the data modeling language proposed in the YANG DATA MODEL DOC. In an embodiment, the application service policy mapping 260 and/or the tunnel mapping 265 may be stored using the read-write YANG data model 800. In such an embodiment, each VPN service that requires a TE underlay tunnel is mapped to the corresponding tunnel 163 with additional application policy mapping, which is shown in box 804. FIG. 8 shows three modules in sequence: service mapping, site mapping, and service application policy mapping. Once the service and site are mapped together, the language in box 800 provides additional application policy associated with the service. Users are given the ability to configure/program the desired per service application policy.

FIG. 9 is a read-only YANG data model 900 defining how service policies 180 are mapped to applications 151-154 and tunnels 163 at the CNC 130 or the central controller 140. The read-only YANG data model 900 is consistent with the data modeling language proposed in the YANG DATA MODEL DOC. In an embodiment, the application service policy mapping 260 and/or the tunnel mapping 265 may be stored using the read-only YANG data model 900. In such an embodiment, the users can access the operational state (read-only) of YANG Data model described in YANG data model 800.

Figure 10:
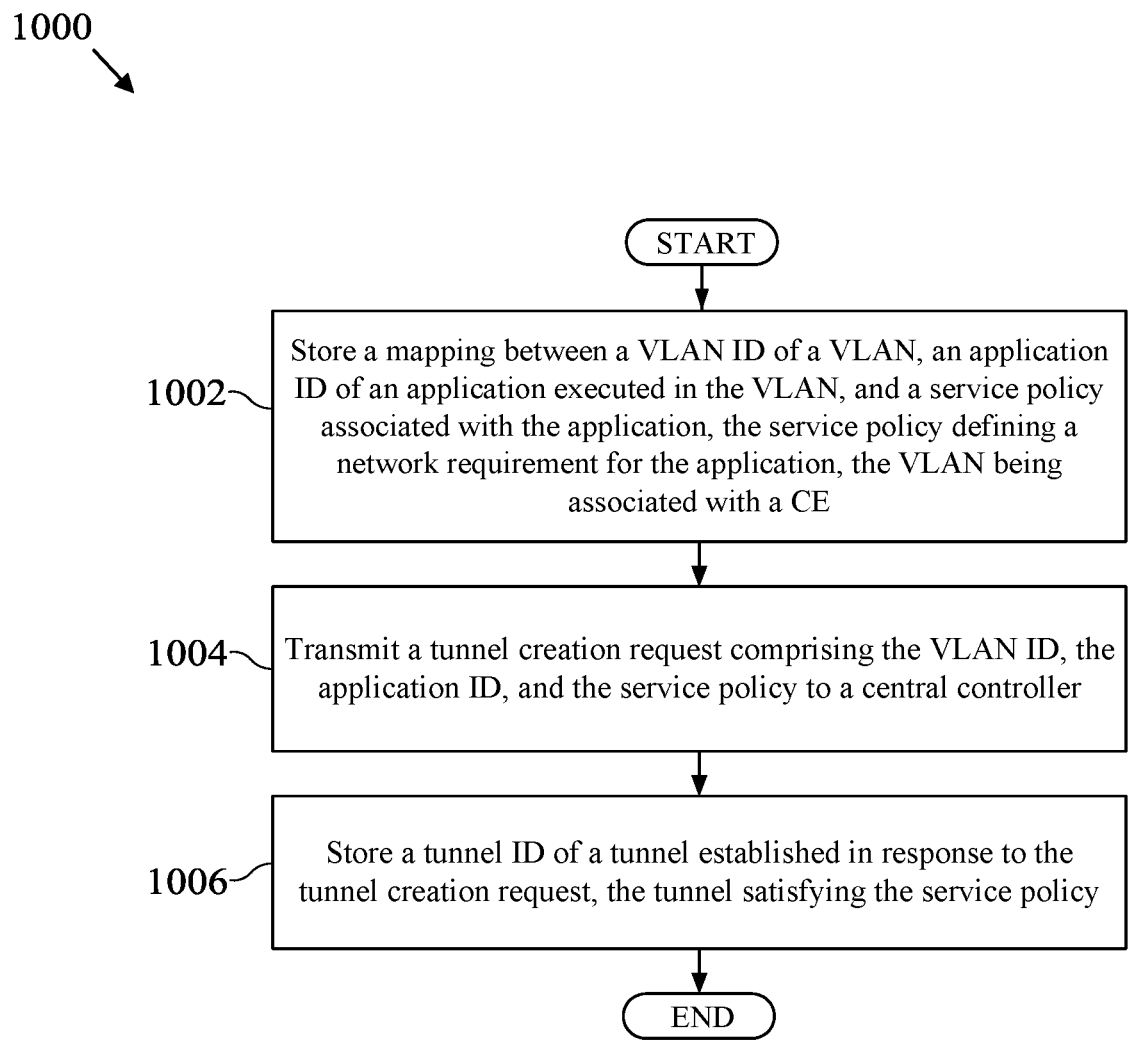
FIG. 10 is a method of initiating the establishment of a tunnel across the network based on a service policy of an application.

FIG. 10 is a method 1000 of initiating the establishment of a tunnel 163 across a network 100 based on a service policy 180 of an application 151-154. The method 1000 may be performed when the CNC 130 receives VLAN information from CEs 103 and 106. In an embodiment, the method 1000 may be performed by the CNC 130. At step 1002, a mapping between a VLAN ID 172, application ID 176 of an application 151-154 executed in the VLAN 143A-N or 146A-N, and a service policy 180 associated with the application 151-154 is stored. For example, memory 250 stores the mapping between a VLAN ID 172, and application ID 176 of an application 151-154 executed in the VLAN 143A-N or 146A-N, and a service policy 180 associated with the application 151-154. In an embodiment, the VLAN ID 172, the application ID 176, and the service policy 180 may be stored in the form of data model 703.

At step 1004, a tunnel creation request 170 is transmitted by the CNC 130. The tunnel creation request 170 may comprise the VLAN ID 172, the application ID 176, and the service policy 180. For example, the Tx 225 transmits the tunnel creation request 170 to the central controller 140. In an embodiment, the Tx 225 may transmit the tunnel creation request 170 to the MDSC or the super controller of network 100. In an embodiment, the Tx 225 may transmit the tunnel creation request 170 to the PNC or domain controller of the network 100. At step 1006, a tunnel ID 190 of the tunnel 163 established in response to the tunnel creation request 170 is stored. For example, memory 250 stores the tunnel ID 190. In an embodiment, the VLAN ID 172, application ID 176, service policy 180, and tunnel ID 190 may be stored in the form of data models 704 and 705.

Figure 11:
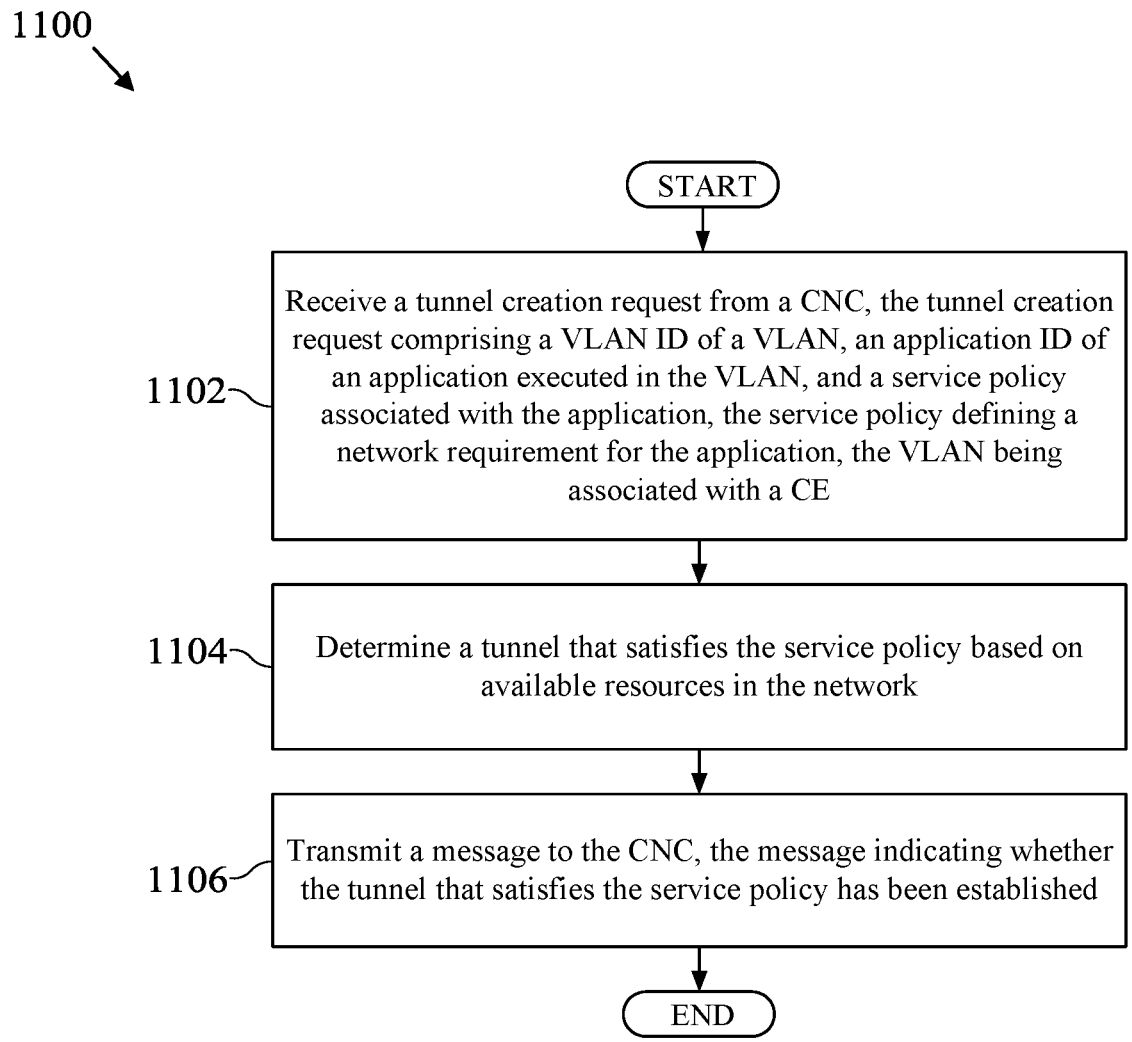
FIG. 11 is a method of establishing a tunnel across a network based on a service policy of an application.

FIG. 11 is a method 1100 of establishing a tunnel 163 across a network 100 based on a service policy 180 of an application 151-154. The method 1100 may be performed when the central controller 140 receives a tunnel creation request 170 from a CNC 130. In an embodiment, the method 1100 may be performed by the central controller 140. For example, the method 1100 may be performed by an MDSC, a super controller, a PNC, and/or a domain controller. At step 1102, a tunnel creation request 170 is received. In an embodiment, the tunnel creation request 170 comprises a VLAN ID 172, and application ID 176 of an application 151-154 executed in the VLAN 143A-N or 146A-N, and a service policy 180 associated with the application 151-154 is stored. For example, Rx 220 receives the tunnel creation request 170 from CNC 130.

At step 1104, a tunnel 163 that satisfies the service policy 180 is determined based on available resources in the network 100. For example, processor 205 determines the tunnel 163 that satisfies the service policy 180 in the tunnel creation request 170. At step 1106, a message indicating whether the tunnel 163 that satisfies the service policy 180 has been established is sent to the CNC 130. For example, Tx 225 transmits the message to the CNC.

Figure 12:
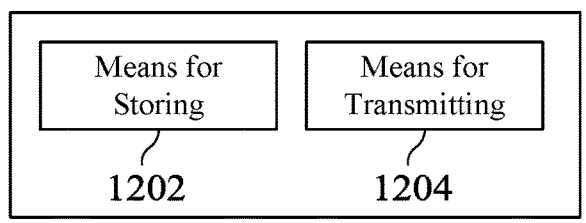
FIG. 12 illustrates an apparatus configured to implement one or more of the methods described herein such as, for example, the method of FIG. 10.

FIG. 12 illustrates is an apparatus 1200 configured to implement one or more of the methods described herein such as, for example, the method 1000 of FIG. 10. The apparatus 1202 comprises means 1202 for storing a mapping between a VLAN ID 172 of a VLAN, an application ID 176 of an application 151-154 executed in the VLAN, and a service policy 180 associated with the application 151-154, the service policy 180 defining a network requirement for the application 151-154, the VLAN being associated with a CE. The apparatus 1202 further comprises a means 1204 for transmitting a tunnel creation request comprising the VLAN ID, the application ID, and the service policy. The means 1202 for storing also includes a means for storing a tunnel ID 190 of a tunnel 1630 established in response to the tunnel creation request 170, the tunnel defining a path between an ingress PE node and an egress PE node that satisfies the service policy.

Figure 13:
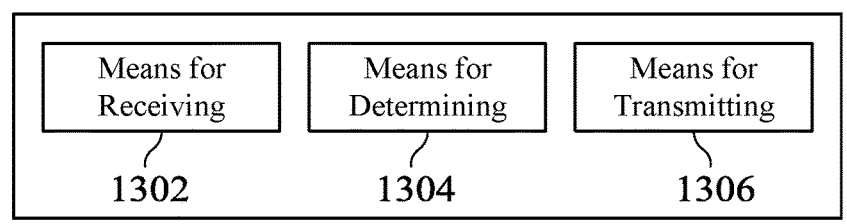
FIG. 13 illustrates an apparatus configured to implement one or more of the methods disclosed herein such as, for example, the method of FIG. 11.

FIG. 13 illustrates is an apparatus 1300 configured to implement one or more of the methods disclosed herein such as, for example, the method 1100 of FIG. 11. The apparatus 1300 comprises means 1302 for receiving a tunnel creation request 170 from a CNC 130, the tunnel creation request 170 comprising a VLAN ID 172 of a VLAN, an application ID 176 of an application 151-154 executed in the VLAN, and a service policy 180 associated with the application 151-154, the service policy 180 defining a network requirement for the application 151-154, the VLAN being associated with a CE), a means 1304 for determining a tunnel 163 that satisfies the service policy 180 based on available resources in the network, and a means 1306 for transmitting a message to the CNC 130, the message indicating whether the tunnel 163 that satisfies the service policy 190 has been established.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

The invention claimed is:

1. A method implemented by a customer network controller (CNC) in a network, comprising:
   storing, by a memory of the CNC, a service policy catalog comprising a plurality of service policies and a plurality of values associated with each of the service policies;
   receiving, by a receiver of the CNC, a first mapping between a virtual local area network (VLAN) identifier (ID) of a VLAN, a first application ID of a first application executed in the VLAN, and a first service policy associated with the first application from a customer edge (CE) associated with the VLAN, the first service policy defining a network requirement for the first application;
   assigning, by a processor of the CNC, one of the values for each of the service policies in the service policy catalog to the first service policy of the first application;
   transmitting, by a transmitter of the CNC to a central controller, a first tunnel creation request comprising the VLAN ID, the first application ID, and the first service policy;
   receiving, by the receiver, a first tunnel ID of a first tunnel established in response to the first tunnel creation request from the central controller, the first tunnel defining a first path between an ingress provider edge (PE) node and an egress PE node that satisfies the first service policy;
   receiving, by the receiver, a second mapping between the VLAN ID, a second application ID of a second application executed in the VLAN, and a second service policy associated with the second application from the CE, the second service policy defining a network requirement for the second application;

assigning, by the processor of the CNC, another one of the values for each of the service policies in the service policy catalog to the second service policy of the second application;

transmitting, by the transmitter to the central controller, a second tunnel creation request comprising the VLAN ID, the second application ID, and the second service policy; and receiving, by the receiver, a second tunnel ID of a second tunnel established in response to the second tunnel creation request from the central controller, the second tunnel defining a second path between the ingress PE node and the egress PE node that satisfies the second service policy.

2. The method of claim 1, further comprising receiving, by the receiver of the CNC, VLAN information from the CE, wherein the VLAN information comprises a plurality of identifiers identifying a plurality of VLANs associated with the CE, a plurality of identifiers identifying a plurality of applications associated with each of the VLANs, and a plurality of service policies for each of the applications.

3. The method of claim 1, wherein the first tunnel creation request and the second tunnel creation request are transmitted to the central controller together in a single message.

4. The method of claim 1, further comprising: receiving a first message indicating that the first tunnel satisfying the first service policy has been established in the network; and receiving a second message indicating that the first tunnel satisfying the first service policy has been established in the network.

5. The method of claim 4, wherein the first and second messages are received from the central controller, wherein the central controller includes at least one of a Multi-Domain Service Coordinator (MDSC), Provisioning Network Controller (PNC), super controller, or domain controller.

6. The method of claim 1, further comprising: storing, by the memory, the first tunnel ID of the first tunnel and the second tunnel ID of the second tunnel.

7. A central controller configured to establish traffic engineered (TE) tunnels in a network, comprising:
a receiver configured to: receive a first tunnel creation request from a customer network controller (CNC), the first tunnel creation request comprising a first virtual local area network (VLAN) identifier (ID) of a VLAN, a first application ID of a first application executed in the VLAN, and a first service policy associated with the first application, the first service policy defining a network requirement for the first application, the first service policy indicating a first value from a service policy catalog, the service policy catalog comprising a plurality of service policies and a plurality of values associated with each of the service policies; and
receive a second tunnel creation request from the CNC, the second tunnel creation request comprising the VLAN ID, a second application ID of a second application executed in the VLAN, and a second service policy associated with the second application, the second service policy defining a network requirement for the second application, the second service policy indicating a second value from the service policy catalog;
a processor coupled to the receiver and configured to:
determine a first tunnel that satisfies the first service policy based on available resources in the network in response to the first tunnel creation request; and
determine a second tunnel that satisfies the second service policy based on the available resources in the network in response to the second tunnel creation request; and
a transmitter coupled to the processor and configured to:
transmit a first message to the CNC, the first message indicating whether the first tunnel that satisfies the first service policy has been established; and
transmit a second message to the CNC, the second message indicating whether the second tunnel that satisfies the first service policy has been established.

8. The central controller of claim 7, wherein the first tunnel and the second tunnel are established between an ingress provider edge (PE) router coupled to the CE and an egress PE router coupled to a second CE, wherein the second CE is associated with a service provider.

9. The central controller of claim 7, wherein the first tunnel creation request and the second tunnel creation request are transmitted to a Multi Domain Service Coordinator (MDSC) or super controller.

10. The central controller of claim 7, wherein the central controller is a software defined network (SDN) controller.

11. The central controller of claim 7, wherein the first service policy comprises a value defining at least one of a bandwidth, a throughput, a latency, or an error rate associated with the first application, and wherein the second service policy comprises a value defining at least one of a bandwidth, a throughput, a latency, or an error rate associated with the second application.

12. The central controller of claim 7, wherein the processor is further configured to determine a first tunnel ID that uniquely identifies the first tunnel and a second tunnel ID that uniquely identifies the second tunnel.

13. A customer network controller (CNC) implemented in a network, comprising:
a memory configured to store a service policy catalog comprising a plurality of service policies and a plurality of values associated with each of the service policies;
a receiver configured to:
receive a first mapping between a virtual local area network (VLAN) identifier (ID) of a VLAN, a first application ID of a first application executed in the VLAN from a customer edge (CE) associated with the VLAN, and a first service policy associated with the first application, the first service policy defining a network requirement for the first application; and
receive a second mapping between the VLAN ID, a second application ID of a second application executed in the VLAN from the CE, and a second service policy associated with the second application, the second service policy defining a network requirement for the second application; and
a processor coupled to the memory and the receiver, the processor being configured to:
assign one of the values for each of the service policies in the service policy catalog to the first service policy of the first application; and
assign another one of the values for each of the service policies in the service policy catalog to the second service policy of the second application; and
a transmitter coupled to the receiver and configured to:
transmit a first tunnel creation request comprising the VLAN ID, the first application ID, and the first service policy to a central controller; and
transmit a second tunnel creation request comprising the VLAN ID, the second application ID, and the second service policy to the central controller; and the memory being coupled to the receiver and the transmitter, the memory being further configured to:
- store a first tunnel ID of a first tunnel established in response to the first tunnel creation request, the first tunnel defining a first path between an ingress provider edge (PE) node and an egress PE node that satisfies the first service policy, and
- store a second tunnel ID of a second tunnel established in response to the second tunnel creation request from the central controller, the second tunnel defining a second path between the ingress PE node and the egress PE node that satisfies the second service policy.

14. The CNC of claim 13, wherein the receiver is further configured to receive VLAN information from the CE, wherein the VLAN information comprises a plurality of identifiers identifying a plurality of VLANs associated with the CE, a plurality of identifiers identifying a plurality of applications associated with each of the VLANs, and a plurality of service policies for each of the applications.

15. The CNC of claim 13, wherein the first tunnel creation request and the second tunnel creation request are transmitted to the central controller together in a single message.

16. The CNC of claim 13, wherein the receiver is further configured to: receive a first message indicating that the first tunnel satisfying the first service policy has been established in the network; and receive a second message indicating that second tunnel satisfying the second service policy has been established in the network.

17. The CNC of claim 16, wherein the first and second messages are received from the central controller, wherein the central controller is a provisioning network controller or a multi-domain service coordinator.

18. The CNC of claim 13, wherein the receiver is further configured to receive the first tunnel ID and the second tunnel ID from the central controller.

* * * * *